(12) United States Patent
Miretsky et al.

(10) Patent No.: US 11,818,172 B1
(45) Date of Patent: Nov. 14, 2023

(54) SYSTEM, METHOD, AND COMPUTER PROGRAM FOR A COMPUTER ATTACK RESPONSE SERVICE

(71) Applicant: Amdocs Development Limited, Limassol (CY)

(72) Inventors: Denis Miretsky, Raanana (IL); Vladimir Tkach, Kefar Yona (IL); Sergey Podalov, Herzliya (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 142 days.

(21) Appl. No.: 17/410,880

(22) Filed: Aug. 24, 2021

(51) Int. Cl.
  *H04L 9/40* (2022.01)
  *G06F 21/53* (2013.01)
  *G06F 21/56* (2013.01)

(52) U.S. Cl.
  CPC ...... *H04L 63/1491* (2013.01); *H04L 63/1408* (2013.01); *G06F 21/53* (2013.01); *G06F 21/56* (2013.01); *H04L 63/14* (2013.01)

(58) Field of Classification Search
  CPC ... H04L 63/1491; H04L 63/1408; H04L 9/40; H04L 63/14; G06F 21/53; G06F 21/56
  See application file for complete search history.

(56) References Cited

U.S. PATENT DOCUMENTS

| | | | |
|---|---|---|---|
| 7,908,653 B2 * | 3/2011 | Brickell | G06F 21/51 709/215 |
| 10,075,457 B2 * | 9/2018 | Dubuc | G06F 21/53 |
| 10,084,817 B2 | 9/2018 | Saher et al. | |
| 10,560,434 B2 | 2/2020 | Bingham et al. | |
| 10,567,395 B2 * | 2/2020 | Gafni | H04L 63/168 |
| 2005/0149726 A1 * | 7/2005 | Joshi | G06F 21/51 726/4 |
| 2006/0021029 A1 * | 1/2006 | Brickell | G06F 21/51 726/22 |
| 2018/0167412 A1 | 6/2018 | Barrett et al. | |
| 2019/0294778 A1 * | 9/2019 | De Gaetano | G06F 21/552 |
| 2021/0067553 A1 | 3/2021 | Ries et al. | |
| 2021/0273950 A1 * | 9/2021 | Lawson | H04L 41/145 |

(Continued)

FOREIGN PATENT DOCUMENTS

| | | | |
|---|---|---|---|
| CN | 106557689 A | * | 4/2017 |
| CN | 112511517 A | * | 3/2021 |

(Continued)

OTHER PUBLICATIONS

Anonymous, "Malware," Wikipedia, Aug. 18, 2021, 16 pages, retrieved from https://en.wikipedia.org/wiki/Malware.

(Continued)

*Primary Examiner* — Jayesh M Jhaveri
(74) *Attorney, Agent, or Firm* — Zilka-Kotab, P.C.

(57) ABSTRACT

As described herein, a system, method, and computer program provide a computer attack response service. In use, a notification is received that a transfer of at least one electronic file to a computing device has been detected as a potential incoming threat to the computing device. Responsive to the receiving the notification, at least one honeypot is created. Additionally, data within the at least one electronic file is accessed, using the at least one honeypot. Responsive to accessing the data within the at least one electronic file, activity associated with the incoming threat is monitored.

19 Claims, 4 Drawing Sheets

(56) References Cited

U.S. PATENT DOCUMENTS

2022/0014543 A1* 1/2022 Jakobsson ............ H04L 63/1425
2023/0007042 A1* 1/2023 Haworth ............. H04L 63/1441

FOREIGN PATENT DOCUMENTS

| CN | 108959922 B | * | 11/2021 |
| WO | WO-2005043360 A1 | * | 5/2005 |
| WO | 2013113532 A1 | | 8/2013 |
| WO | 2020069741 A1 | | 4/2020 |

OTHER PUBLICATIONS

Anonymous, "Honeypot (computing)," Wikipedia, May 7, 2021, 8 pages, retrieved from https://en.wikipedia.org/wiki/Honeypot_(computing).

Anonymous, "Confidentiality, Integrity and Availability—The CIA Triad," undated, accessed Aug. 24, 2021, 5 pages, retrieved from https://www.certmike.com/confidentiality-integrity-and-availability-the-cia-triad/#:~:text=Confidentiality%20means%20that%20data%2C%20objects,and%20the%20resources%20they%20need.

* cited by examiner

SYSTEM, METHOD, AND COMPUTER PROGRAM FOR A COMPUTER ATTACK RESPONSE SERVICE

FIELD OF THE INVENTION

The present invention relates to mechanisms for handling computer attacks.

BACKGROUND

Computer systems are vulnerable to various types of incoming threats, which may be in the form of a file received via some source such as email, attachment, transfer, etc.). For example, the best-known types of malware, viruses, and worms are known for the manner in which they spread, rather than any specific types of behavior. A computer virus is software that embeds itself in some other executable software (including the operating system itself) on the target computer system without the user's knowledge and consent and when it is run, the virus is spread to other executables. On the other hand, a worm is a stand-alone malware software that actively transmits itself over a network to infect other computer systems and can copy itself without infecting files. These definitions lead to the observation that a virus requires the user to run an infected software or operating system for the virus to spread, whereas a worm spreads itself.

Firewalls, antivirus software, and security awareness trainings are main methods used for preventing incoming threats. Nonetheless, such methods exhibit various limitations, including that they do not provide defense from zero-day attacks and repeatable attacks based on a similar pattern of prior detected incoming threats. There is thus a need for addressing these and/or other issues associated with the prior art.

SUMMARY

As described herein, a system, method, and computer program provide a computer attack response service. In use, a notification is received that a transfer of at least one electronic file to a computing device has been detected as a potential incoming threat to the computing device. Responsive to the receiving the notification, at least one honeypot is created. Additionally, data within the at least one electronic file is accessed, using the at least one honeypot. Responsive to accessing the data within the at least one electronic file, activity associated with the incoming threat is monitored.

DETAILED DESCRIPTION

Figure 1:
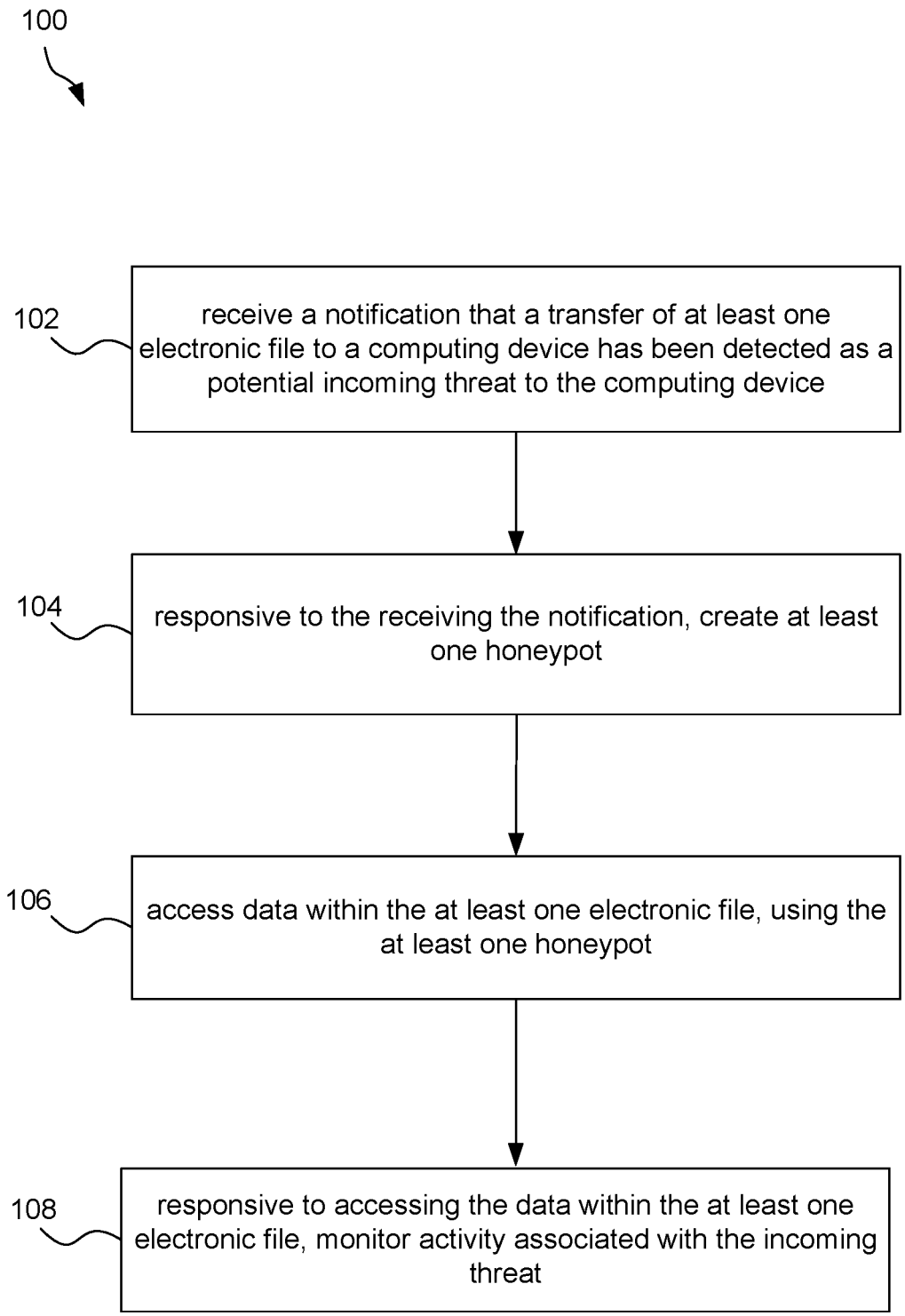
FIG. 1 illustrates a method for responding to an attack on a computing device, in accordance with one embodiment.

FIG. 1 illustrates a method 100 for responding to an attack on a computing device, in accordance with one embodiment. The method 100 may be performed by any computer system described below with respect to FIGS. 3 and/or 4. For example, the method 100 may be performed by a computer attack response service that operates on a server in the cloud, a local network (e.g. intranet) to which the computing device is connected, the computing device itself, or any combination thereof.

In operation 102, a notification is received that a transfer of at least one electronic file to a computing device has been detected as a potential incoming threat to the computing device. The computing device is any device having at least a processor and a memory and to which electronic files are capable of being transferred. For example, the computing device may be an end user device (e.g. mobile device, personal computer, etc.).

The electronic file is a computer resource for recording data in a computer storage device. The electronic file may be any document, image, or other content having data therein. In one embodiment, the at least one electronic file may be transferred to the computing device as an attachment to an electronic mail message. In another embodiment, the at least one electronic file may be transferred to the computing device as a download to the computing device. Of course, however, the transfer may refer to any method of moving the file from a source device to the computing device (e.g. over a network). It should be noted that the transfer may refer to a completed transfer (i.e. where the electronic file is stored on the computing device) or an intercepted transfer (i.e. where the electronic file has been intercepted in transit to the computing device).

The notification that the transfer has been detected as a potential incoming threat may be received from the computing device, from the local network (e.g. intranet) to which the computing device is connected, from the computer attack response service that operates on the server in the cloud, or from any other device configured to detect potential incoming threats. In various examples, the potential incoming threat may be detected using a firewall, antivirus software, or other application of the device configured to detect potential incoming threats.

In operation 104, responsive to the receiving the notification, at least one honeypot is created. A honeypot refers to a computer resource that simulates the computing device or any other computing device. In one embodiment, the honeypot may be a computer security mechanism set to detect, deflect, or, in some manner, counteract attempts at unauthorized use of information systems. The honeypot may consist of data (for example, in a network site) that appears to be a legitimate part of the site that seems to contain information or a resource of value to attackers, but actually that is isolated and monitored and enables blocking or analyzing the attackers. For example, the honeypot may be connected to a sandbox that simulates the computing device or any other computing system. In one embodiment, the honeypot may be a virtual machine. It should be noted that the at least one honey pot may refer to a single honeypot or a group of connected honeypots.

In one embodiment, activity (e.g. user activity) may be simulated in the honeypot. Accordingly, in another embodiment, a state of the honeypot may be updated based on the simulated activity. The state may refer to the simulated activity performed on the honeypot, such as a login process, an authentication process, creating and/or deleting files, etc. The state may refer to a timestamp indicating a last simulated activity performed (simulated) on the honeypot. The state may refer to (simulated) data located (e.g. stored) on the honeypot via the simulated activity.

In another embodiment, the honeypot may include a machine learning model. The machine learning model may be configured to classify the potential incoming threat, as described in more detail below.

In operation 106, data within the at least one electronic file is accessed, using the at least one honeypot. For example, the electronic file may be opened, read, etc. within the honeypot. By using the honeypot to access the data within the electronic file, any potential threat (e.g. malware, virus, etc.) within the electronic file may be isolated within the honeypot and prevented from spreading outside of the honeypot.

In operation 108, responsive to accessing the data within the at least one electronic file, activity associated with the incoming threat is monitored. For example, any activity occurring within the honeypot, as a (e.g. direct) result of accessing the data within the electronic file, may be monitored. The activity may refer to any events, executed functions, data accesses, etc. occurring within the honeypot. Various actions may then be performed, based on the monitored activity (e.g. issuing an alert when the activity is determined to correlate with an actual incoming threat).

As noted above, in one embodiment the honeypot may include a machine learning model. With regard to this embodiment, the machine learning model may be configured to classify the potential incoming threat based on the monitored activity associated with the incoming threat. In one embodiment, when the machine learning model classifies the potential incoming threat as expected behavior, then the honeypot may be released. Expected behavior may refer to activity that is known, or predefined as being wanted, or not predefined as being unwanted. Further to this embodiment, the computing device may be allowed to access the data within the electronic file.

In another embodiment, when the machine learning model classifies the potential incoming threat as unexpected behavior, then the activity associated with the incoming threat may be stored in a data structure. Unexpected behavior refers to activity that is unknown, or not predefined as being wanted, or predefined as being unwanted. As a further option to this embodiment, an alert may be issued to a security team. For example, the alert is issued based on an analysis of the activity associated with the incoming threat with historical information stored in the data structure. Further to this embodiment, the computing device may be prevented from accessing the data within the electronic file.

To this end, the method 100 may be performed for responding to a potential incoming threat, or attack, on the computing device. The method 100 may use the honeypot to isolate any actual threat during analysis of the electronic file, as noted above. Furthermore, the method 100 may use machine learning to detect whether the potential incoming threat is an actual threat. To this end, the method 100 described herein may provide defense from zero-day attacks (i.e. computer-software vulnerabilities unknown to those who should be interested in its mitigation, such as the vendor of the target software) and repeatable attacks based on a similar pattern.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
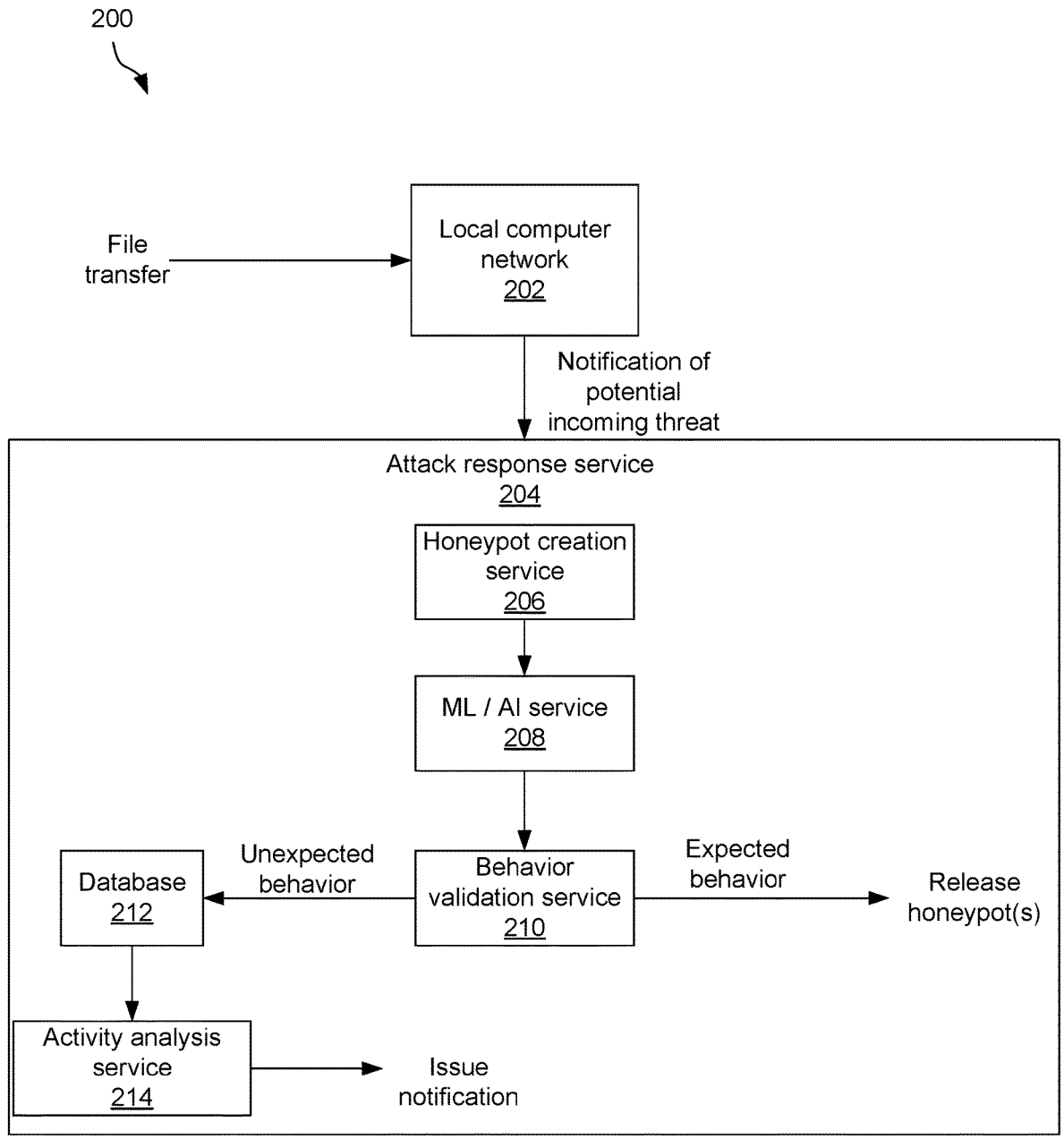
FIG. 2 illustrates a flow diagram for a system in which a computer attack response service is provided, in accordance with one embodiment.

FIG. 2 illustrates a flow diagram for a system 200 in which a computer attack response service is provided, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

The present system 200 may be referred to herein as an "Attack Surgical System." As shown, a file transfer to a computing device is detected by a local computer network 202 as a potential incoming threat (e.g. a potential attack). For example, the threat may refer to malware, which is any software intentionally designed to cause damage to a computer, server, client, or computer network, such as a computer virus, worm, Trojan horse, ransomware, spyware, adware, rogue software, wiper, scareware, etc. The local computer network 202 may use a firewall, antivirus software, etc. to detect the file transfer as a potential (e.g. predicted) incoming threat.

The local computer network 202 notifies an attack response service 204 of the potential incoming threat. For example, an "Attack Agent" (e.g. software located in the local computer network 202) may send the electronic file (i.e. detected as the potential incoming threat) to the attack response service 204. The attack response service 204 uses a honeypot creation service 206 to create a honeypot (or group of honeypots) that is connected to a sandbox with a simulated regular isolated computer system and that monitors any intruder activity. The honey pot(s) may be referred to herein as an "Attack Operating Room" for the potential incoming threat.

The attack response service 204 then adds the "Attack Operating Room" to the "Attack Surgical System". This service is responsible for simulating user activity (e.g. authentication, creating/deleting files, etc.), keeping honeypot data in a live state, and collecting and monitoring activities occurring on the honeypot. In one embodiment, the attack response service 204 will generate data using machine learning/artificial intelligence (ML/AI) algorithm according to a user profile (e.g. workstation, system files, database, etc.) of the computing device to which the electronic file was transferred. The attack response service 204 may update data using the ML/AI algorithm for simulating real user work according to his personal profile (e.g. technical writer, accounting, database administrator, manager, etc.)

The attack response service 204 uses a ML/AI service 208 which adds machine learning to the "Attack Operating Room" that is responsible for classifying similar attacks and defining relevant actions. ML refers to an application of AI that provides systems the ability to automatically learn and improve from experience without being explicitly programmed. ML focuses on the development of computer programs that can access data and use it learn for themselves. AI refers to a branch of computer sciences that emphasizes the development of intelligence machines, thinking and working like humans.

The attack response service 204 causes the electronic file to be accessed within the honey pot, and causes any activity occurring as a result of accessing the electronic file to be monitored. The attack response service 204 uses a behavior validation service 210 to determine whether the monitored activity is expected behavior or unexpected behavior (e.g. based on known patterns, the machine learning classification, etc.). When the monitored activity is expected behavior, the attack response service 204 causes the honeypot(s) to be released.

When the monitored activity is unexpected behavior, the attack response service 204 causes a database 212 to store the activity, events, behaviors, items, etc. with a signature. The attack response service 204 may monitor, learn, and then collect potential malicious behavior of inspected elements and store it with a HASH signature. An activity analysis service 214 may analyze the information stored in the database 212 and may issue a notification (e.g. alert) accordingly (e.g. to a security team with full report of the event).

Figure 3:
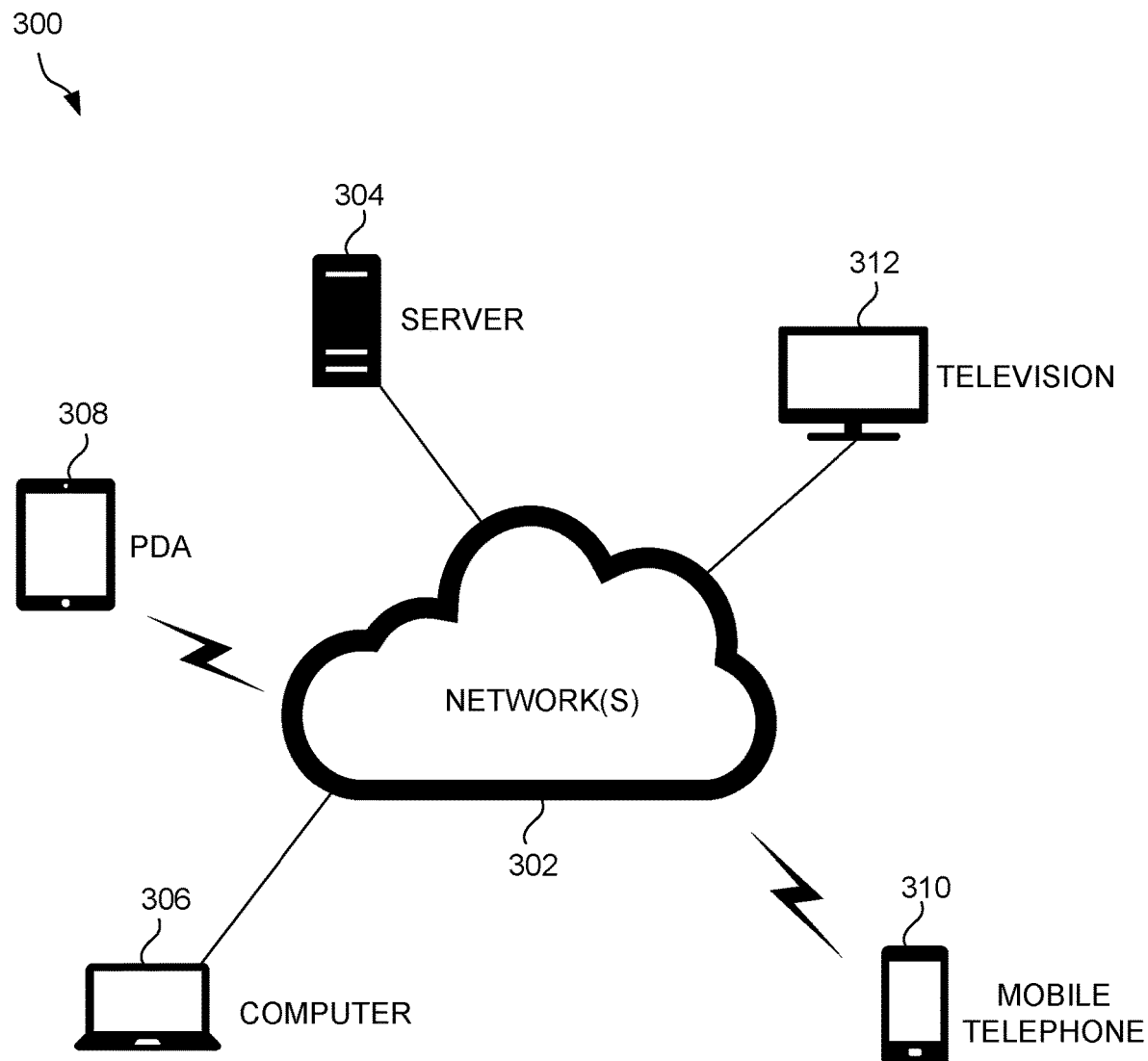
FIG. 3 illustrates a network architecture, in accordance with one possible embodiment.

FIG. 3 illustrates a network architecture 300, in accordance with one possible embodiment. As shown, at least one network 302 is provided. In the context of the present network architecture 300, the network 302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 302 may be provided.

Coupled to the network 302 is a plurality of devices. For example, a server computer 304 and an end user computer 306 may be coupled to the network 302 for communication purposes. Such end user computer 306 may include a desktop computer, lap-top computer, and/or any other type of logic. Still yet, various other devices may be coupled to the network 302 including a personal digital assistant (PDA) device 308, a mobile phone device 310, a television 312, etc.

Figure 4:
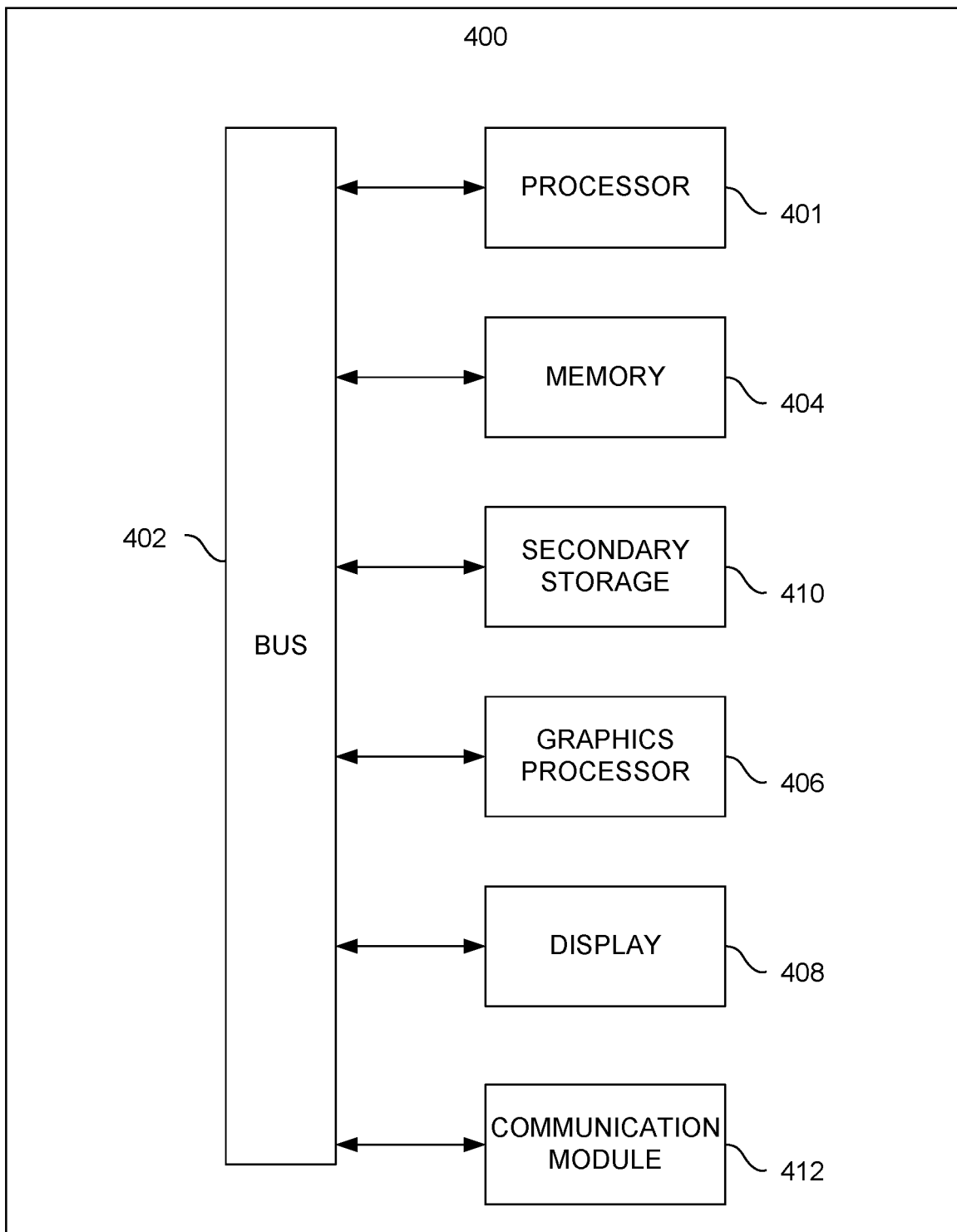
FIG. 4 illustrates an exemplary system, in accordance with one embodiment.

FIG. 4 illustrates an exemplary system 400, in accordance with one embodiment. As an option, the system 400 may be implemented in the context of any of the devices of the network architecture 300 of FIG. 3. Of course, the system 400 may be implemented in any desired environment.

As shown, a system 400 is provided including at least one central processor 401 which is connected to a communication bus 402. The system 400 also includes main memory 404 [e.g. random access memory (RAM), etc.]. The system 400 also includes a graphics processor 406 and a display 408.

The system 400 may also include a secondary storage 410. The secondary storage 410 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 404, the secondary storage 410, and/or any other memory, for that matter. Such computer programs, when executed, enable the system 400 to perform various functions (as set forth above, for example). Memory 404, storage 410 and/or any other storage are possible examples of non-transitory computer-readable media.

The system 400 may also include one or more communication modules 412. The communication module 412 may be operable to facilitate communication between the system 400 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
    receive a notification that a transfer of at least one electronic file to a computing device has been detected as a potential incoming threat to the computing device;
    responsive to the receiving the notification, create at least one honeypot;
    simulate user activity within the at least one honeypot, wherein a state of the at least one honeypot is updated based on the simulated user activity and wherein the state includes a timestamp indicating a last user activity simulated on the honeypot;
    access data within the at least one electronic file, using the at least one honeypot;
    responsive to accessing the data within the at least one electronic file, monitor activity occurring within the at least one honeypot as a result of accessing the data within the at least one electronic file; and
    process the activity occurring within the at least one honeypot as a result of accessing the data within the at least one electronic file, using a machine learning model, to classify the potential incoming threat as one of expected behavior or unexpected behavior.

2. The non-transitory computer-readable media of claim 1, wherein the potential incoming threat is detected using at least one of a firewall or antivirus software.

3. The non-transitory computer-readable media of claim 1, wherein the potential incoming threat is detected by the computing device.

4. The non-transitory computer-readable media of claim 1, wherein the potential incoming threat is detected by a local network to which the computing device is connected.

5. The non-transitory computer-readable media of claim 1, wherein the at least one electronic file is transferred as an attachment to an electronic mail message.

6. The non-transitory computer-readable media of claim 1, wherein the at least one honeypot is at least one virtual machine.

7. The non-transitory computer-readable media of claim 1, wherein the at least one honeypot is connected to a sandbox simulating a computing system.

8. The non-transitory computer-readable media of claim 1, wherein the at least one honeypot includes the machine learning model.

9. The non-transitory computer-readable media of claim 1, wherein when the machine learning model classifies the potential incoming threat as the expected behavior, then further comprising:
    release the at least one honeypot.

10. The non-transitory computer-readable media of claim 1, wherein when the machine learning model classifies the potential incoming threat as the unexpected behavior, then further comprising:
    storing the activity occurring within the at least one honeypot as a result of accessing the data within the at least one electronic file in a data structure.

11. The non-transitory computer-readable media of claim 10, wherein when the machine learning model classifies the potential incoming threat as the unexpected behavior, then further comprising:
    issuing an alert to a security team.

12. The non-transitory computer-readable media of claim 11, wherein the alert is issued based on an analysis of the activity occurring within the at least one honeypot as a result of accessing the data within the at least one electronic file with historical information stored in the data structure.

13. The non-transitory computer-readable media of claim 1, wherein the user activity that is simulated within the at least one honeypot includes one or more of:
    a login process,
    creating files, or
    deleting files.

14. The non-transitory computer-readable media of claim 1, wherein the user activity is simulated to keep the at least one honeypot in a live state.

15. The non-transitory computer-readable media of claim 1, wherein the user activity is simulated according to a profile of a user associated with the computing device.

16. The non-transitory computer-readable media of claim 1, wherein the activity occurring within the at least one honeypot that is monitored includes at least one of:
events,
executed functions, or
data accesses.

17. A method, comprising:
at a computer system:
receiving a notification that a transfer of at least one electronic file to a computing device has been detected as a potential incoming threat to the computing device;
responsive to the receiving the notification, creating at least one honeypot;
simulating user activity within the at least one honeypot, wherein a state of the at least one honeypot is updated based on the simulated user activity and wherein the state includes a timestamp indicating a last user activity simulated on the honeypot;
accessing data within the at least one electronic file, using the at least one honeypot;
responsive to accessing the data within the at least one electronic file, monitoring activity occurring within the at least one honeypot as a result of accessing the data within the at least one electronic file; and
processing the activity occurring within the at least one honeypot as a result of accessing the data within the at least one electronic file, using a machine learning model, to classify the potential incoming threat as one of expected behavior or unexpected behavior.

18. A system, comprising:
a non-transitory memory storing instructions; and
one or more processors in communication with the non-transitory memory that execute the instructions to:
receive a notification that a transfer of at least one electronic file to a computing device has been detected as a potential incoming threat to the computing device;
responsive to the receiving the notification, create at least one honeypot;
simulate user activity within the at least one honeypot, wherein a state of the at least one honeypot is updated based on the simulated user activity and wherein the state includes a timestamp indicating a last user activity simulated on the honeypot;
access data within the at least one electronic file, using the at least one honeypot;
responsive to accessing the data within the at least one electronic file, monitor activity occurring within the at least one honeypot as a result of accessing the data within the at least one electronic file; and
process the activity occurring within the at least one honeypot as a result of accessing the data within the at least one electronic file, using a machine learning model, to classify the potential incoming threat as one of expected behavior or unexpected behavior.

19. The system of claim 18, wherein the one or more processors are located on at least one of: a server in a cloud, a local network to which the computing device is connected, or the computing device.

\* \* \* \* \*